United States Patent [19]

Hashimoto

[11] 4,147,181
[45] Apr. 3, 1979

[54] SWIVELLING WATER FAUCET
[75] Inventor: Hisao Hashimoto, Naganoken, Japan
[73] Assignee: Iwatani Sangyo Kabushiki Kaisha, Osaka, Japan
[21] Appl. No.: 845,022
[22] Filed: Oct. 25, 1977
[51] Int. Cl.² .......................................... F16K 31/524
[52] U.S. Cl. .................................. 137/616.5; 251/339; 251/349; 251/82; 251/251
[58] Field of Search ............... 251/82, 251, 349, 352, 251/339; 137/616.5, 801

[56] References Cited
U.S. PATENT DOCUMENTS 759,246  5/1904  Delany .......................... 137/616.5
2,222,273  11/1940  Worthington .................... 251/349
3,168,113  2/1965  McJohnson ...................... 251/349
3,834,665  9/1974  Kurioka ......................... 251/349
3,888,461  6/1975  Bron ............................ 251/349
3,980,101  9/1976  Kurioka ......................... 251/349

FOREIGN PATENT DOCUMENTS 11368  2/1933  Australia ....................... 251/349

Primary Examiner—Martin P. Schwadron
Assistant Examiner—H. Jay Spiegel
Attorney, Agent, or Firm—Thomas R. Morrison

[57] ABSTRACT

A water faucet is opened by swivelling the faucet pipe to at least one predetermined position and is closed by swivelling to any other position.

11 Claims, 4 Drawing Figures

SWIVELLING WATER FAUCET

BACKGROUND OF THE INVENTION

The present invention relates to a swivelling water faucet adapted for use in homes, hospitals, restaurants, laboratories. More particularly, the present invention is directed to a swivelling water faucet wherein the swivelling pipe functions as a cock handle, thereby eliminating the necessity for providing the cock handle separately.

The known swivelling water faucets are commonly provided with a handle or knot connected to the cock wherein the handle is rotated for operating the cock. This requires two stages of performances on the part of the user; the first performance is to rotate the swivelling pipe (hereinafter referred to as a faucet pipe or merely pipe) around the cock portion, and the second is to rotate the handle in the water supplying direction. If the user is a housewife making dough, a medical doctor performing a surgical operation, a cook handling raw food, or a chemical researcher whose hands are both filled with test-tubes containing dangerous or poisonous chemical substances, it is both difficult and inconvenient to operate the cock handle with his fingers. Another problem is that the cock handle is often kept open due to the user's carelessness, thereby wasting water.

SUMMARY OF THE INVENTION

The present invention solves the problems and inconveniences involved in the known swivelling water faucets, and has for its object an improved swivelling water faucet wherein the pipe as the handle operating the cock when the pipe is swivelled. This allows the user to open and close the cock (i.e. the water-valve) without using his hands. Instead, the user may operate the cock with his wrist or arm or elbow by swivelling the faucet to position it at the desired place in the sink.

According to the present invention a swivelling water faucet is provided with a faucet pipe capable of swivelling around a base attachment adapted to be secured to a wall, with a joint member interposed therebetween, the joint member being provided with two bores eccentrically and communicatingly produced wherein the first bore accommodates a ball valve whereas the second bore rotatively supports the faucet pipe, the ball valve being adapted to open the passage of water when it is raised upwards under the cam action imparted thereto by the faucet pipe.

BRIEF DESCRIPTION OF THE DRAWINGS

The invention will be more particularly described by way of example with reference to the drawings, in which.

DETAILED DESCRIPTION OF THE PREFERRED EMBODIMENT

Figure 1:
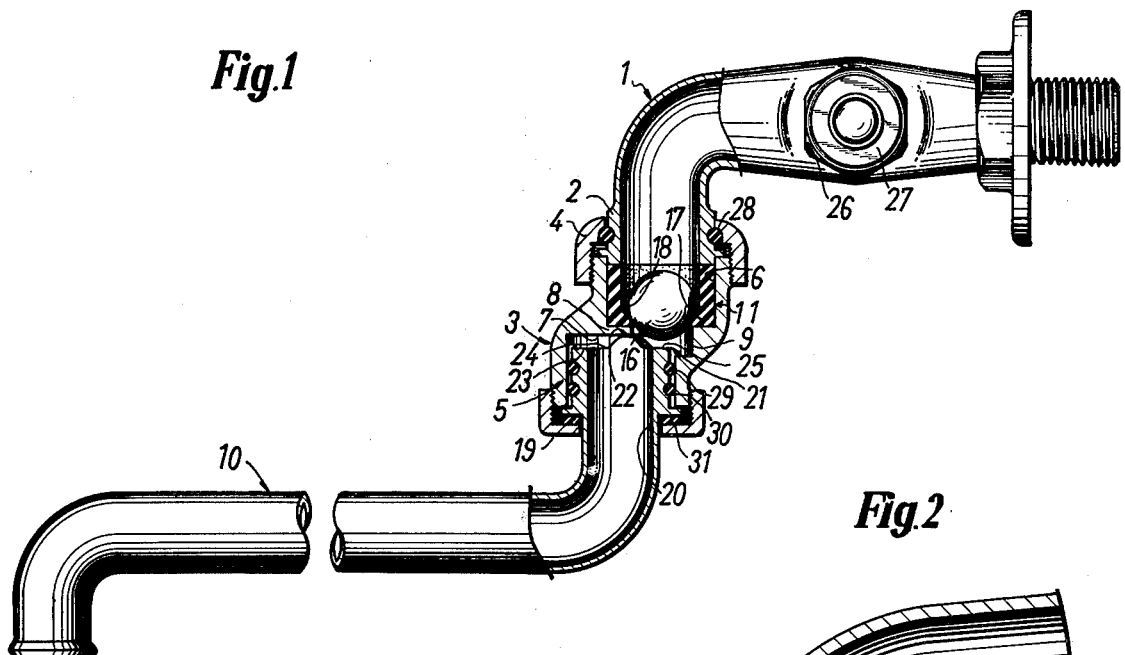
FIG. 1 is a vertical partial cross-section through the swivelling water faucet according to the present invention.

Referring to FIG. 1, a stationary base portion 1 is secured to the wall (not shown) behind the washing-up sink (not shown) so as to receive a water supply from outside. An outlet 2 from the base portion 1 is directed downward. A joint member 3 is connected to the outlet 2. The joint member 3 contains first and second bores 6 and 7 which are eccentrically and communicatingly arranged. An aperture or gap 9 is provided between bores 6 and 7 for allowing the flow of fluid to pass through. The joint member 3 is fastened to the outlet 2 of the base portion by means of a union nut 4 with a resilient ring 28 interposed therebetween. The first bore 6 accommodates a valve ball 16, and the second bore rotatatively supports the faucet pipe 11.

The axes of the two bores 6 and 7 are preferably displaced from each other by a distance substantially equal to the radius of the bore 7. The aperture 9 is located concentric with the bore 6. The size of the aperture 9 is such that it can be completely closed by the spherical surface of the valve ball 16. Sealing members 29, 30 and 31 prevent leakage from bore 7 while allowing the pipe 10 to swivel. The bore 6 is protected against leakage by a resilient sealing member 11. In the illustrated embodiment the sealing member 11 is fabricated as a seat valve for receiving the lower spherical surface of the valve ball 16. Thus, when the valve ball 16 comes into contact with the valve seat, the flow of water is shut off. The sealing member 11 is fitted in the bore 6 such that its inside wall 15 is on the same plane with that of the base portion 1. The valve ball 16 can be made of metal or plastics.

Figure 2:
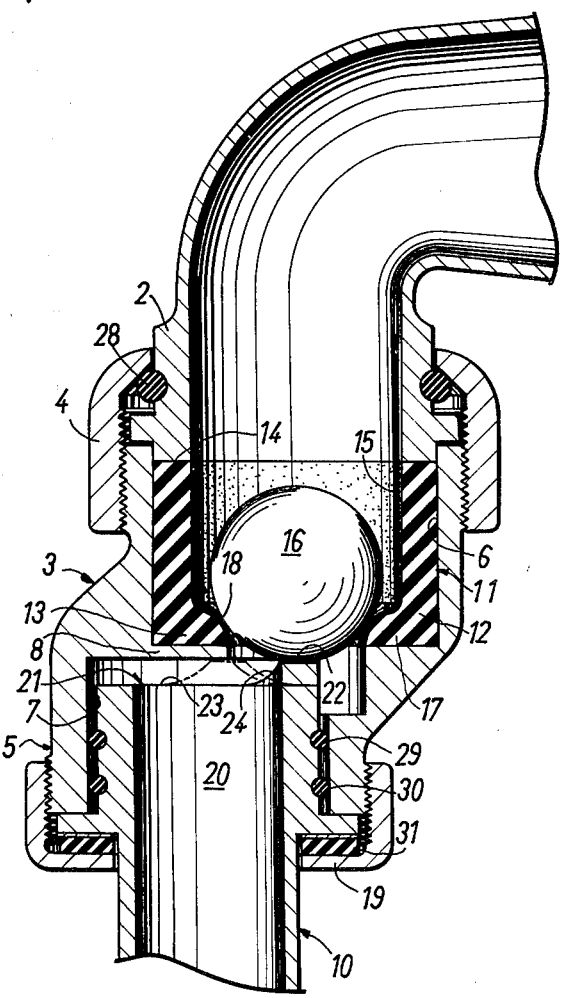
FIG. 2 is a vertical cross-section on a larger scale through the main section particularly showing the water-valve being held open.

As is apparent from the description and most clearly shown in FIG. 2, the sealing member 11 has three functions; one is as a sealing means, a second is as a guide means for orientating the valve ball 16 and a third is as a valve seat. Advantageously the sealing member 11 can be made in one piece of rubber or plastics, thereby leading to the economy in production and the simplicity in structure.

The seat surface 18 of the sealing member 11 is shaped so as to snugly fit against the spherical surface of the valve ball 16. Preferably the seat surface has a rounded shape to prevent sticking of the valve ball 16 therein. This is particularly advantageous when the valve ball 16 comes out of touch with the seat surface 18. The separation will be facilitated by virtue of the shapes of the surfaces. This ensures that the water supply quickly responds to the operation of the faucet pipe 10.

The lower portion of the valve ball 16 projects slightly through the aperture 9 into the bore 7 when in the closed position illustrated.

The faucet pipe 10 is held in the bore 7 of the joint 3 such that the pipe can be swivelled around the base portion 1. In the illustrated embodiment a union nut 19 is used to hold the pipe 10 in a rotatable, free state in the bore 7, wherein sealing members 29, 30 and 31 are used as mentioned above. A bent pipe is normally employed for the faucet pipe 10.

Figure 3:
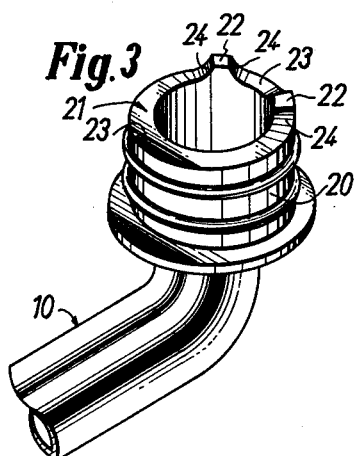
FIG. 3 is a perspective view of a terminating end portion of the faucet pipe on which a cam face is formed.

Referring now to FIG. 3, the terminating end of the pipe at which the pipe is held in the joint 3 has a cam face 21 containing two projections 22, slopes 24 produced at both sides of the projections, and planes 23. The angle of the slope 24 is 12° at maximum. The height of the projection 22 to the plane 23 is preferably about 18% of the diameter of the ball 16, and the circumferential length of the flat portion on top of the projection 22 is preferably about 30% of the diameter of the ball 16.

When the faucet pipe 10 is rotated around its axis in the bore 7, the lower surface of the ball 16 comes into contact with the irregular cam face 21, and when it comes into contact with the projection 22, the valve ball 16 is pushed upwards, thereby producing a gap between the ball and the aperture 9, as illustrated in FIG. 2. When the ball 16 has passed the projection 22 on the cam face, it can smoothly come down guided by the slope 24 formed at both sides of the projection. This slope 24 is also helpful in smoothly urging the ball 16 upwards. In this way the ball 16 can smoothly rise and fall with respect to the aperture 9. The height of the projection 22 to the plane 23 can be in the range of from about 15% to about 22% of the diameter of the ball 16, and the elevation of the slope 24 can be in the range of from about 10° to about 20°. The circumferential length of the flat portion on top of the projection can be decided in the range of from about 3% to about 44% of the diameter of the ball 16, depending upon the desired coverage of water supply by the faucet pipe 10 in the sink.

Between the ball 16 and the cam face 21 of the faucet pipe there is provided an allowance 25, as best illustrated in FIG. 1, so that the spherical surface of the ball can tightly fit in the aperture even if the seat surface 18 is worn, or a dimensional error in production exists.

Figure 4:
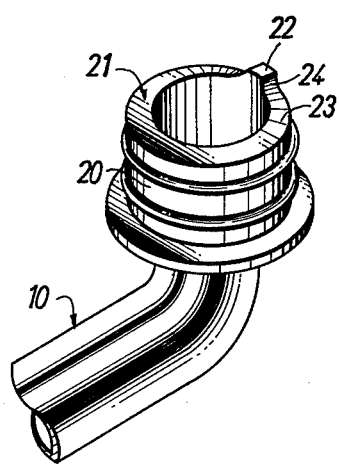
FIG. 4 is a perspective view of a modified version of the terminating end portion of the faucet pipe.

The cam face 21 illustrated in FIG. 4 has only one projection 22, and this version is adapted for a washing table with a single sink. In this case when the faucet pipe 10 is swivelled to a place at right angle to the wall, the valve ball is pushed upwards by the projection, thereby allowing the flow to pass through the aperture 9. On the contrary, the first-mentioned embodiment is adapted for a washing table with two sinks divided by a separator. The first projection is for the first sink, and the second is for the second sink.

A typical example of the operation will be explained:

The faucet pipe 10 is put along the wall when it is not in use. When the user uses it, he swivels the pipe to the desired place in the washing-up sink. During the swivelling movement the ball 16 comes into contact with the projection 22 on the cam face 21. At this stage the valve ball 16 is pushed upwards to allow the water to pass through the aperture 9. When the washing table has two sinks divided, the faucet pipe will be swivelled by 45° from the wall, where the pipe is positioned above the first sink, ready to supply the water by the engagement of the valve ball 16 with the first projection. When the second sink needs the water, the faucet pipe will be swivelled further by 90° so as to position above the second sink. In the same manner the water is supplied therein.

As is evident from the foregoing, according to the present invention it is not required to operate a handle or knob connected to the water-valve. Instead, by swivelling the faucet pipe 10 to its working position the valve is opened to enable the flow to pass through. The user is thus saved the trouble of operating a separate handle. This has solved the problem of sanitation, and the handling difficulty, and also the problem of waste of water.

In FIG. 1 reference numeral 26 denotes a control valve for regulating the amount of water, which is operated by a handle 27.

Various other modifications can be made without departing from the scope of the invention; for example, it is possible to reverse the positions of the base portion and the faucet pipe upside down, wherein the shape of the faucet pipe can be various to fit for the position, such as an arch shape, a shape bended like a swan neck.

What is claimed is:

1. A swivelling water faucet comprising a base portion, a swivelling faucet pipe, and a joint member interposed therebetween, said joint member having first and second parallel bores eccentrically and communicatingly produced wherein the first bore communicating with said base portion, means in the second bore for rotatatively supporting said faucet pipe, a gap between said first and second bores, valve ball means in said first bore for closing and opening said gap, said valve ball means being adapted to projection through said gap part way into said second bore, said joint member positioning the perimeter of said faucet pipe substantially aligned with the said valve ball, a cam face on said faucet pipe adjacent said valve ball means having at least one axial projection adapted to engage with that portion of said valve ball which projects into said second bore through said gap, thereby moving said valve ball parallel to the axis of said first bore to allow the water into said faucet pipe.

2. A swivelling water faucet as set forth in claim 1, wherein the axes of the bores are displaced from each other by the radius of the supported end portion of said faucet pipes.

3. A swivelling water faucet as set forth in claim 1, wherein said valve ball means comprises: a valve seat having a rounded seating surface, and a valve ball adapted to sealingly seat in said valve seat.

4. A swivelling water faucet as set forth in claim 3, wherein the valve seat is made of resilient material.

5. A swivelling water faucet as set forth in claim 1, wherein the height of the projection to the end face of the faucet pipe is in the range of from about 15% to about 22% of the diameter of said valve ball.

6. A swivelling water faucet as set forth in claim 1, wherein the projection on the cam face is provided with a flat surface on its top for receiving said valve ball, wherein the circumferential length of said flat surface is in the range of from about 3% to about 44% of the diameter of said valve ball.

7. A swivelling water faucet as set forth in claim 1, wherein the projection on the cam face includes slopes circumferentially produced at its both sides, said slopes of from about 10° to about 12°.

8. In a fluid faucet of the type having a base portion, a faucet pipe adapted to swivelling with respect to said base portion and valve means interposed therebetween, the improvement comprising:
(a) valve ball means in said valve means for controlling the flow of fluid from said base portion to said faucet pipe;
(b) cam means on said faucet pipe for opening said valve ball means at at least one preselected angular position of said faucet pipe;
(c) first and second bores in said valve means;
(d) said first bore being adapted to receive fluid from said base portion;
(e) said second bore being adapted to deliver fluid to said faucet pipe;
(f) the axis of said first and second bores being displaced from each other;

(g) a gap concentric with said first bore between said first and second bores;

(h) the perimeter of said faucet pipe intersecting the axis of said gap;

(i) said valve ball means being seatable in said gap and projecting part way therethrough; and (j) said cam means contacting said valve ball and moving it out of seating relationship with said gap when said faucet pipe is swivelled to its at least one preselected angular position.

9. The faucet recited in claim 8 further comprising said at least one preselected angular position being at least two preselected angular positions.

10. The faucet recited in claim 10 further comprising:

(a) a resilient valve seat in said first bore having a seat substantially coaxial with said gap;

(b) said valve ball upstream adjacent said valve seat adapted to sealing contact with said valve seat; and (c) a flow opening in said valve seat coaxial with said seat.

11. A swivelling fluid faucet comprising:

(a) a base portion means for receiving the fluid supplied;

(b) a swivelling faucet pipe for delivering said fluid;

(c) joint means for connecting said swivelling faucet pipe to said base portion means;

(d) a first bore recessed at one end of said joint means;

(e) said first bore being in open fluid communication with said base portion means;

(f) a second bore recessed at the second end of said joint means;

(g) a wall in said joint means separating said first and second bores;

(h) a cylindrical aperture piercing said wall joining said first and second bores;

(i) said cylindrical aperture being eccentric with respect to said second bore;

(j) at least one cam means forming an axial extension on the end of said faucet pipe connected by said joint means;

(k) valve ball means in said first bore for sealingly fitting said cylindrical aperture and shutting off the flow of fluid therethrough, said valve ball means protruding through said cylindrical aperture part way into said second bore when in its sealing condition;

(l) said cam means being operative to engage the portion of said valve ball means protruding into said second bore and to move said valve ball means toward said first bore whereby the sealing fit between said valve ball means and said cylindrical aperture is interrupted and fluid is permitted to flow through said cylindrical aperture and said faucet pipe when said faucet pipe is swivelled to at least a first angular position; and (m) said cam means being further operative at at least a second angular position of said faucet pipe to disengage said valve ball means and to permit sealing fit between said valve ball means and said cylindrical aperture.

* * * * *